(12) United States Patent
Coskun et al.

(10) Patent No.: US 8,555,283 B2
(45) Date of Patent: Oct. 8, 2013

(54) TEMPERATURE-AWARE AND ENERGY-AWARE SCHEDULING IN A COMPUTER SYSTEM

(75) Inventors: Ayse K. Coskun, La Jolla, CA (US);
Kenny C. Gross, San Diego, CA (US);
Keith A. Whisnant, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1331 days.

(21) Appl. No.: 11/871,369

(22) Filed: Oct. 12, 2007

(65) Prior Publication Data
US 2009/0100437 A1    Apr. 16, 2009

(51) Int. Cl.
*G06F 9/45*    (2006.01)
*G06F 1/00*    (2006.01)

(52) U.S. Cl.
USPC .......................................... 718/102; 713/300

(58) Field of Classification Search
None
See application file for complete search history.

(56) References Cited

U.S. PATENT DOCUMENTS

| | | | |
|---|---|---|---|
| 7,437,581 B2 * | 10/2008 | Grochowski et al. | 713/320 |
| 2003/0079151 A1 * | 4/2003 | Bohrer et al. | 713/320 |
| 2005/0125701 A1 * | 6/2005 | Hensbergen et al. | 713/320 |
| 2009/0094481 A1 * | 4/2009 | Vera et al. | 714/11 |

OTHER PUBLICATIONS

Coskun et al., "Temperature Aware Task Scheduling in MPSoCs", May 29, 2007, IEEE, pp. 1-6.*

* cited by examiner

*Primary Examiner* — Kenneth Tang
(74) *Attorney, Agent, or Firm* — Park, Vaughan, Fleming & Dowler, LLP; Steven E. Stupp (57) ABSTRACT

A computer system to schedule loads across a set of processor cores is described. During operation, the computer system receives a process to be executed. Next, the computer system obtains one or more thermodynamic process characteristics associated with the process and one or more thermodynamic processor-core characteristics associated with operation of the set of processor cores. Then, the computer system schedules the process to be executed by at least one of the processor cores based on the one or more thermodynamic process characteristics and the one or more thermodynamic processor-core characteristics.

19 Claims, 6 Drawing Sheets

TEMPERATURE-AWARE AND ENERGY-AWARE SCHEDULING IN A COMPUTER SYSTEM

RELATED APPLICATION

This application is related to a pending U.S. patent application entitled, "Method and Apparatus for Balancing Thermal Variations Across a Set of Computer Systems," by inventors Steven F. Zwinger, Kenny C. Gross, and Ramakrishna C. Dhanekula, having Ser. No. 11/479,542, and filing date Jun. 30, 2006, and to a pending U.S. patent application entitled, "Method and Apparatus for Balancing Thermal Variations Across a Set of Computer Systems," by inventors Kenny C. Gross, Keith A. Whisnant, Ramakrishna C. Dhanekula, and Steven F. Zwinger, having Ser. No. 11/588,788, and filing date Oct. 27, 2006. The above-listed applications are hereby incorporated by reference.

BACKGROUND

1. Field of the Invention

The present invention relates to techniques for balancing thermal variations and/or energy variations across a set of processors or processor cores in a computer system.

2. Related Art

Elevated temperatures pose a variety of challenges during the design and operation of modern computer systems, including challenges associated with: reliability, timing, performance, cooling costs, and/or leakage power. For example, because of the increasing power densities in computer systems, cooling has become increasingly expensive, both for large-scale computer systems and for multiprocessor systems on-chip (MPSoC). Moreover, the associated temperature increases exacerbate reliability issues, because hot spots and thermal cycling can increase the rate of failures during device lifetimes.

In addition to problems associated with high temperatures and temperature cycling, some failure mechanisms are affected by temperature gradients. For example, as feature sizes shrink, spatial-temperature variations can cause: timing failures due to variable delay, issues in clock-tree design, and other performance challenges. In particular, because local resistances scale linearly with temperature, rising temperatures increase these resistances, thereby increasing circuit delays and ohmic losses. Note that global clock networks on chips are especially vulnerable to such spatial temperature variations because they extend all over the chip.

Moreover, in computer systems that include multiple processor or multiple processor cores, operating-system-level schedulers are often used to perform load balancing and to distribute workload evenly across the processors (or processor cores) is periodically distributed as evenly as possible. In general, load balancing increases processor utilization and therefore results in better performance. However, these schedulers often do not take the effects of temperature variations into account when determining workload schedules. Consequently, the resulting schedules often lead to temperature distributions that can exacerbate temperature-induced problems.

Hence, what is needed are techniques for balancing workloads in a computer system without the problems described above.

SUMMARY

One embodiment of the present invention provides a computer system that schedules loads across a set of processor cores. During operation, the computer system receives a process to be executed. Next, the computer system obtains one or more thermodynamic process characteristics associated with the process and one or more thermodynamic processor-core characteristics associated with operation of the set of processor cores. Then, the computer system schedules the process to be executed by at least one of the processor cores based on the one or more thermodynamic process characteristics and the one or more thermodynamic processor-core characteristics.

In some embodiments, the one or more thermodynamic process characteristics are associated with previous executions of the process. For example, the one or more thermodynamic process characteristics may be based on an average of the one or more thermodynamic process characteristics associated with previous executions of other processes. Moreover, the one or more thermodynamic process characteristics may include a thermal history and/or energy consumption.

In some embodiments, the one or more thermodynamic processor-core characteristics include a thermal history and/or energy consumption.

In some embodiments, the scheduling is based on a bi-variate function that includes the one or more thermodynamic process characteristics and the one or more thermodynamic processor-core characteristics. For example, the bi-variate function may include energy consumption and a thermal history of the set of processor cores, and the scheduling may attempt to balance energy consumption and temperature across the set of processor cores.

In some embodiments, the scheduling is initially based on either the one or more thermodynamic process characteristics or the one or more thermodynamic processor-core characteristics, and is then refined based on the other of the one or more thermodynamic process characteristics and the one or more thermodynamic processor-core characteristics.

In some embodiments, the one or more thermodynamic process characteristics and the one or more thermodynamic processor-core characteristics are assigned different weights when the scheduling is determined.

In some embodiments, the scheduling of the process involves assigning the process to one or more processor cores that have the least thermal stress.

In some embodiments, the set of processor cores are included in multiple processors or in a single processor.

In some embodiments, the computer system updates stored values of the one or more thermodynamic process characteristics associated with the process when the process is completed, thereby facilitating closed-loop control. Moreover, in some embodiments the computer system updates stored values of the one or more thermodynamic processor-core characteristics associated with operation of the set of processor cores after a time interval has elapsed, thereby facilitating closed-loop control.

Another embodiment provides a method including at least some of the above-described operations.

Another embodiment provides a computer-program product that facilitates the above-described operations on a computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems and processes may be used to schedule processes (henceforth referred to as 'jobs') for execution by a set of processors or a set of processor cores, which may be included in a single processor or in multiple processors. In particular, a computer system may routinely determine or measure thermodynamic characteristics, such as energy consumption and/or temperature (or a related metric), associated with a given job and with each of the processor cores while the given job is executing. Moreover, these thermodynamic characteristics may be aggregated and stored, thereby establishing a thermal history and/or an energy-consumption history associated with execution of the jobs.

When another instance of the given job is received in a job queue, a scheduler in the computer system may use the thermodynamic characteristics, in addition to the load and memory volatility, to schedule the given job for execution by at least one of the processor cores. For example, the scheduling may be determined using a bi-variate function that includes one or more thermodynamic process characteristics and one or more thermodynamic processor-core characteristics, which attempts to balance energy consumption and temperature across the set of processor cores. Consequently, in some embodiments the job is assigned to one or more processor cores that have the least thermal stress.

By performing such energy-aware and/or temperature-aware scheduling, this technique can lower and balance temperature and energy utilization at runtime with low performance overhead. Moreover, intelligent, energy-aware and/or temperature-aware scheduling can improve reliability and reduce operating costs in a wide variety of computer systems, including: servers, laptop computers, personal computers, work stations, mainframe computers, a digital signal processor, a portable-computing device, a personal organizer, a device controller, a computational engine within an appliance, as well as those computer systems that utilize symmetric multiprocessing (SMP) and/or multiprocessor system on-chip (MPSoC) architectures. In some embodiments, the scheduling technique is used in conjunction with dynamic power management and/or dynamic voltage-scaling features.

Note that the computer system may be at one location or may be distributed over multiple, geographically dispersed locations. Consequently, instructions associated with the given job may be received and communicated within the computer system over a network, such as: the Internet or World Wide Web (WWW, an Intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

Figure 1:
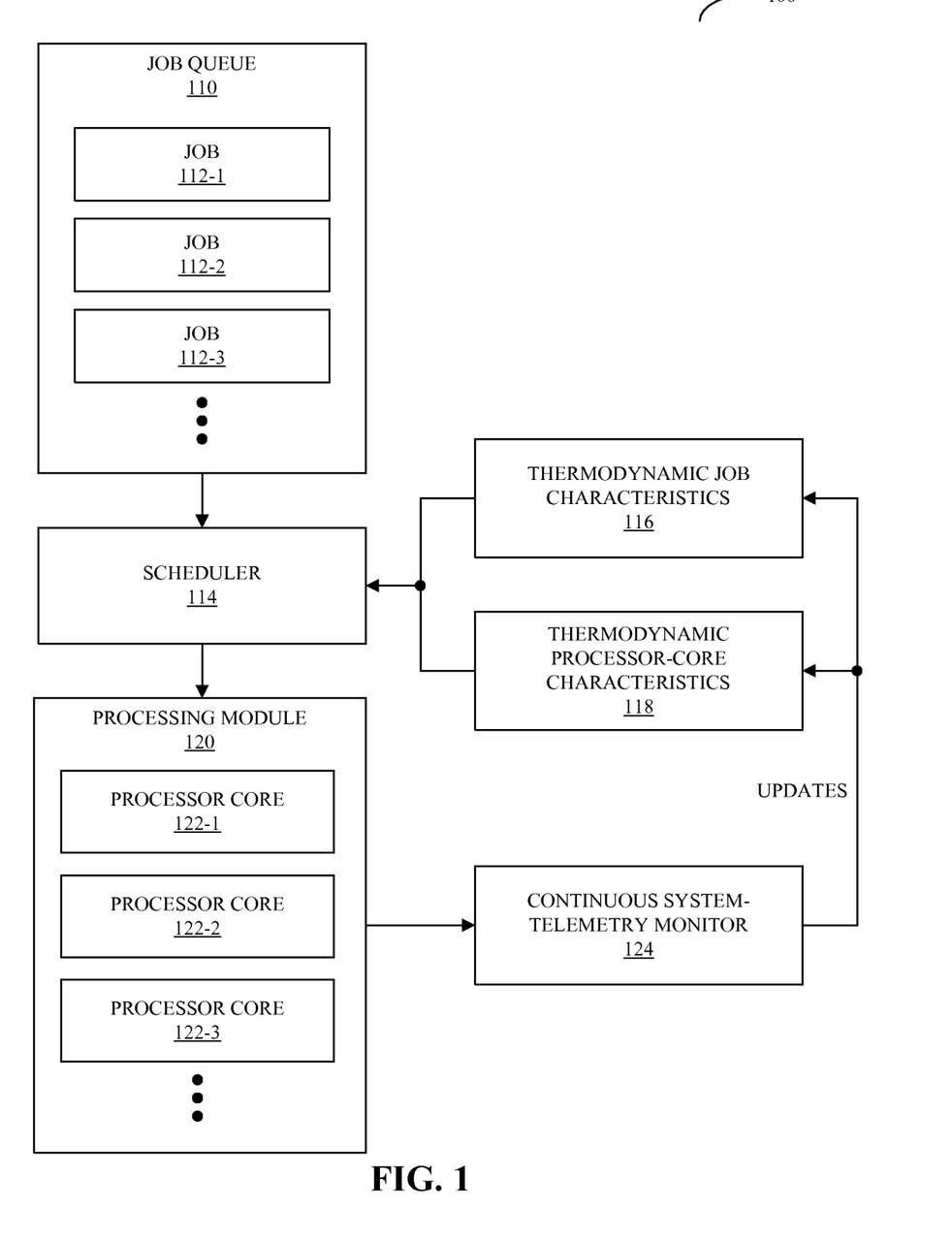
FIG. 1 is a block diagram illustrating a computer system in accordance with an embodiment of the present invention.

We now describe embodiments of a computer system, a method, and software for scheduling loads across a set of processor cores. FIG. 1 presents a block diagram illustrating an embodiment of a computer system 100. In this computer system, jobs 112 are received and added to a job queue 110. Next, scheduler 114, such as an OS-level scheduler, assigns a given job, such as job 112-1, to be executed by one or more processor cores 122 in a processing module 120.

Typically, schedulers, such as scheduler 114, perform load balancing, in which jobs 112 are assigned based on resource availability to optimize the throughput in the computer system 100. Note that factors associated with resource availability can include, but are not limited to: the number of processor cores 122, the speed of the processor cores 122, the amount of memory, the amount of disk space, currently available processor cores 122, and the closest available memory. However, existing scheduling approaches are performed without regard to the energy consumption and/or the temperature of the processor cores 122. This can cause hot spots or hot zones in processing module 120, which can result in temperature gradients and/or thermal cycling of the processor cores 122 (and the previously described problems, such as reductions in reliability and performance), especially when the computer system 100 is operating at less than 100% utilization.

Figure 2:
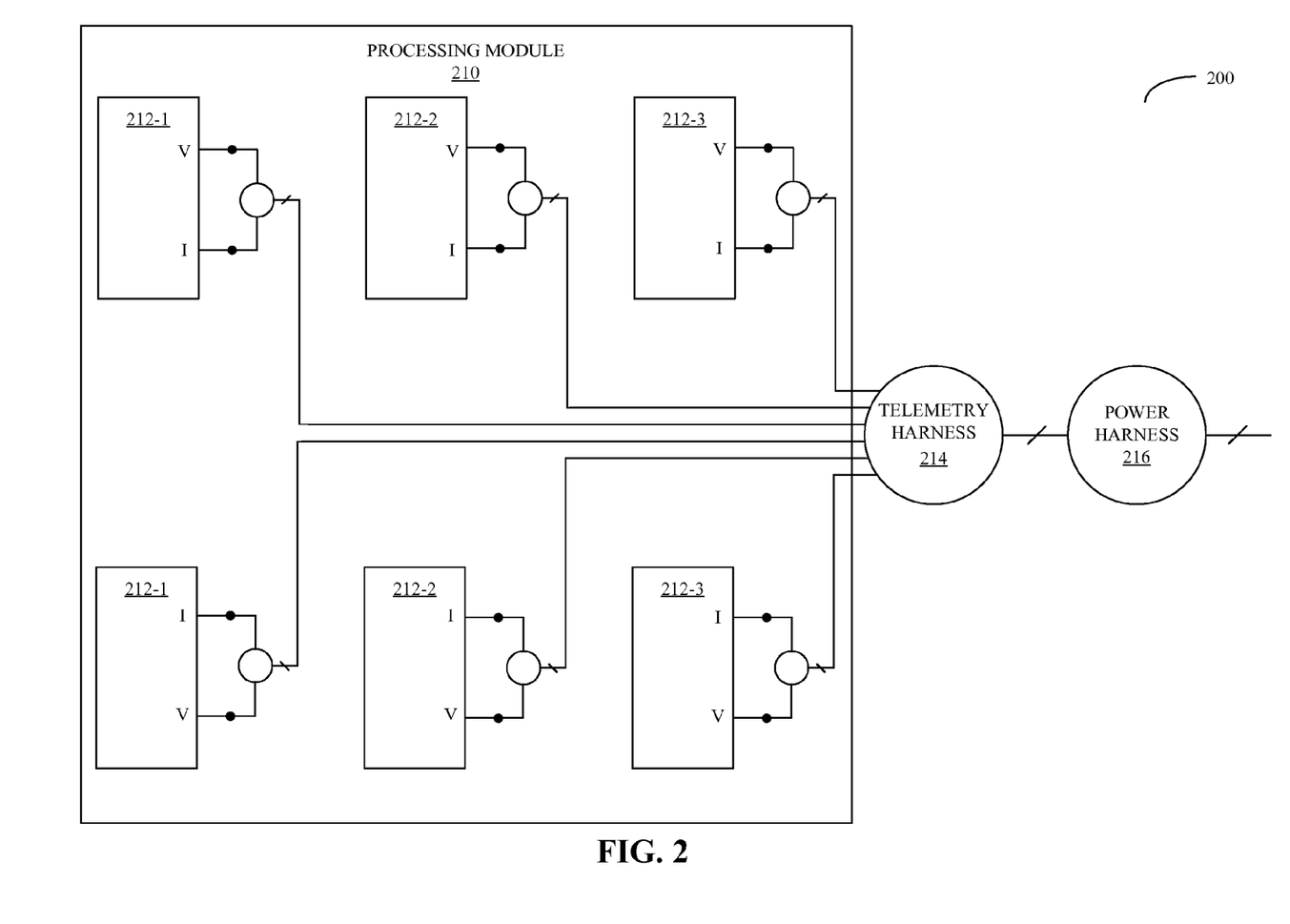
FIG. 2 is a block diagram illustrating a computer system in accordance with an embodiment of the present invention.

To overcome this problem, continuous telemetry monitoring (via continuous system-telemetry monitor 124), which is described further below with reference to FIG. 2, is used to build up and routinely update a history of thermodynamic characteristics associated with jobs 112 and previously executed jobs, and with each of the processor cores 122 when the given job is executing. These thermodynamic characteristics are stored in data structures (such as tables), including thermodynamic job characteristics 116 and thermodynamic processor-core characteristics 118.

In some embodiments, the thermodynamic characteristics include metrics associated with energy consumption and temperature. For example, the continuous system-telemetry monitor 124 may collect the actual observed energy and temperature dynamics in a multiple-processor or multiple-processor-core system in near real-time. Moreover, observations for different jobs may be stored in the thermodynamic job characteristics 116 along with the associated user ids and job names. When the given job executes for the first time, the entry in the thermodynamic job characteristics 116 may be initialized with an empirical estimate of the temperature and energy consumption of the processor cores 122 that will execute the given job. Then, when the given job (with the same owner and job name) is executed again, the previously stored observations may be updated. In this way, this data structure becomes more accurate as the history is accumulated, for example, as the thermodynamic characteristics are averaged over time.

A wide variety of metrics may be used for the energy consumption and temperature associated with the given job and/or associated with each of the processor cores 122 (at a given time). In some embodiments, the energy metric reflects how much energy is consumed while running the given job and/or how much energy is consumed by each of the processor cores 122 during a time interval. In principle, the temperature metric may be more complicated than the current temperature in the processor cores 122. In particular, even though different processor cores may have different temperatures, they may or may not have different thermal stresses. Consequently, in some embodiments the temperature metric may reflect the recent thermal stress in the processor cores 122 and/or the recent thermal stress in the processor cores 122 that have executed the given job. For example, the thermal stress may be represented by the temperature profile over time for each job and/or for each of the processor cores 122.

Note that both energy consumption and the temperature achieved are separately important. Energy consumption is important because, ultimately, the cooling of the computer system 100 must be able to remove that amount of energy (based on simple conservation of energy). However, the efficiency of power dissipation in the computer system 100 affects the temperature achieved. For example, a tiny, 10-W chip can reach very-high temperatures if heat-removal is inefficient. Conversely, a 200-W chip may stay quite cool if the coolant provisioning and heat-removal are efficient.

In general, for a given cooling capacity in the computer system 100, the most efficient energy-consumption distribution is when the energy consumption is uniform across a chip. Similarly, for performance and reliability reasons, a uniform temperature distribution across the chip is also desirable. In this regard, thermodynamic job characteristics 116 and the thermodynamic processor-core characteristics 118 facilitate energy-aware and temperature-aware scheduling in the computer system 100. In turn, this capability facilitates near real-time closed-loop balancing of the temperature and energy-consumption across the processor cores 122 (and more generally, across multiple processors), and thus, facilitates compensation for spatial and temporal temperature variations across multiple processor cores 122 and/or multiple chips.

Consequently, for a set of jobs currently executing, this technique may facilitate an optimal energy-consumption and temperature configuration (which decreases cooling expenses, eases temperature-related design challenges, and improves system reliability), while simultaneously meeting performance requirements by adjusting for varying load profiles across the processor cores 122. Moreover, these goals can be achieved with low hardware and performance overhead.

Note that in some embodiments computer system 100 includes fewer or additional components. Moreover, two or more components may be combined into a single component and/or a position of one or more components may be changed.

We now discuss embodiments of continuous telemetry monitoring. FIG. 2 presents a block diagram illustrating an embodiment of a computer system 200, in which real-time temperature and energy-consumption telemetry are generated by sensors in the computer system 200 (which are sometimes referred to as a 'power harness'). In particular, a variety of instrumentation signals are monitored in real-time during operation of the computer system 200. (Note that although we refer to a single computer system in the discussion of the monitoring process which follows, the present invention also applies to a collection of computer systems).

These instrumentation signals can include signals associated with 'internal performance parameters' maintained by software within the computer system 200. For example, these internal performance parameters can include: system throughput, transaction latencies, queue lengths, load on one or more processors or processor cores, load on the memory, load on the cache, I/O traffic, bus saturation metrics, FIFO overflow statistics, and/or various operational profiles gathered through 'virtual sensors' located within the operating system. Moreover, the instrumentation signals can also include signals associated with 'canary performance parameters' for synthetic-user transactions, which are periodically generated for the purpose of measuring quality of service from the end user's perspective.

Additionally, the instrumentation signals can include 'physical parameters' such as: distributed internal temperatures, environmental variables (such as relative humidity, cumulative or differential vibrations within the computer system 200, fan speed, acoustic signals, current noise, voltage noise, and/or time-domain reflectometry readings), and/or energy consumption (such as currents and voltages).

Computer system 200 includes a power harness 216, a telemetry harness 214, and sub-components 212, such as multiple processor or processor cores in a processing module 210. Power harness 216 may be a software-based tool that reads time-domain traces of the sensor variables from the telemetry harness 214 and computes the total power consumption (and thus, the energy consumption) based on the time-domain traces of the sensor variables. In a variation on this embodiment, the software-based tool is integrated into the computer system 200 as a software patch.

Telemetry harness 214 may be coupled to the sensor outputs in sub-components 212. Through these connections, telemetry harness 214 polls and aggregates the sensor variables for these sub-components. In some embodiments, telemetry harness 214 measures a voltage and an associated current from sensors in each of the sub-components 212 within the computer system 200. Note that the sub-components 212 can report other variables, such as temperature. Also note that the telemetry harness 214 may measure sensor variables simultaneously from each sub-component within the computer system 200.

Values of a sensor variable may be reported in either an interrupt mode, periodically and/or continuously. For example, while operating in interrupt mode, the computer system 200 only receives a value of a sensor variable if the value exceeds a high-threshold value or a low-threshold value, and thereby causes an interrupt to occur. However, in some embodiments the sensors are periodically and/or continuously polled to create a dynamic trace of the sensor variables. In doing so, the computer system 200 creates a time-domain trace of the sensor variables for each sub-component and uses the time-domain trace to calculate total power consumption or the total energy consumption for the sub-components 212 and/or the computer system 200 as a function of time.

In some embodiments, the computer system 200 uses one or more calibration factors for a given class of computer system and/or for individual sensors to estimate power consumption or energy consumption based on dynamic traces of currents and associated voltages that are directly measured using a hardware power monitor, which accurately measures the power consumption of the sub-components 212 and/or the computer system 200. These calibration factors may compensate for inaccuracies in the power-consumption or energy-consumption calculation resulting from biases in low-accuracy sensors used in the computer system 200.

Note that in some embodiments computer system 200 includes fewer or additional components. Moreover, two or more components may be combined into a single component and/or a position of one or more components may be changed.

Figure 3A:
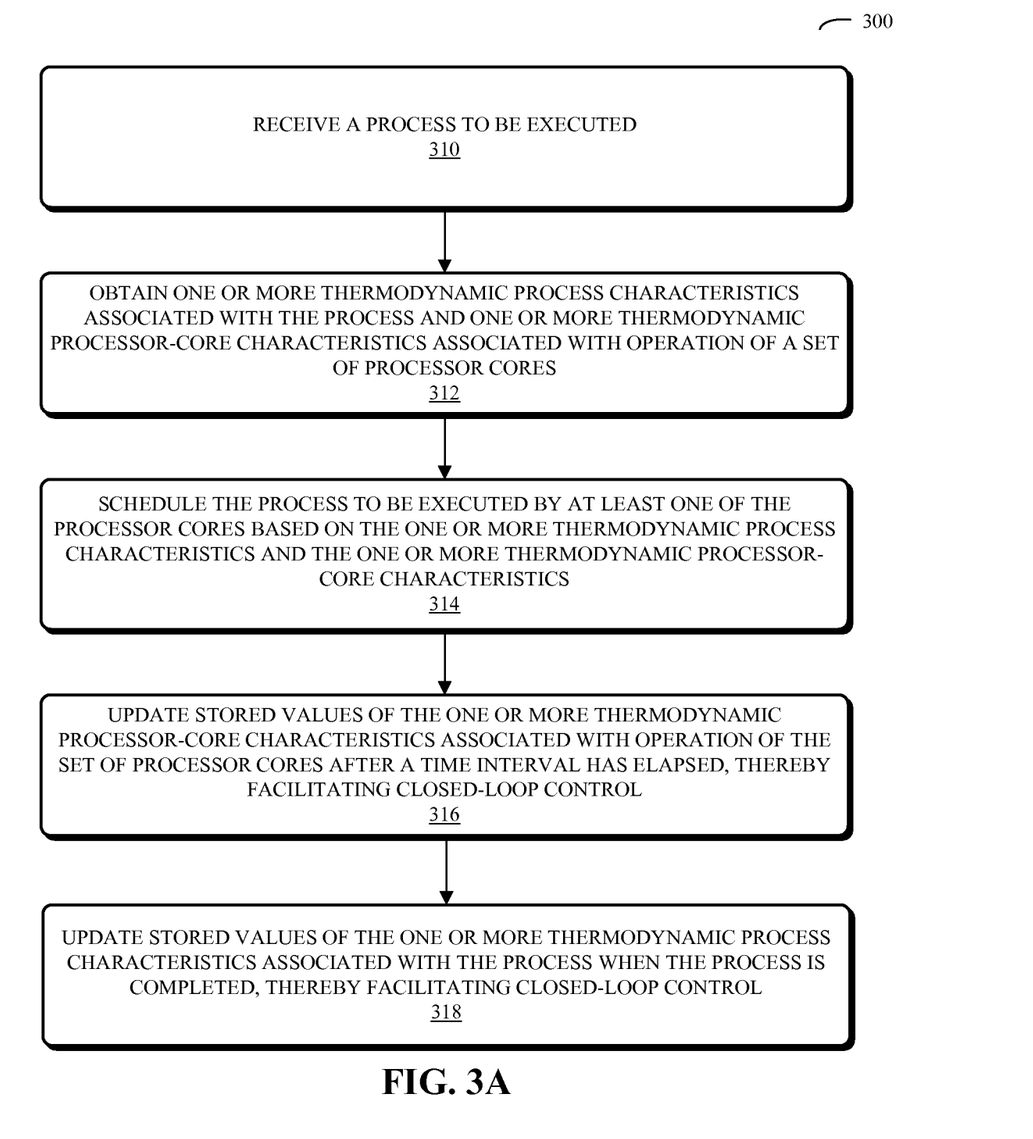
FIG. 3A is a flow chart illustrating a process for scheduling loads across a set of processor cores in accordance with an embodiment of the present invention.

We now discuss methods for scheduling loads across a set of processor cores. FIG. 3A presents a flow chart illustrating an embodiment of a process 300 for scheduling loads across a set of processor cores, which may be implemented by a computer system, such as the computer system 100 (FIG. 1) and/or the computer system 200 (FIG. 2). During operation, the computer system receives a process to be executed (310). Next, the computer system obtains one or more thermodynamic process characteristics associated with the process and one or more thermodynamic processor-core characteristics associated with operation of the set of processor cores (312). Then, the computer system schedules the process to be executed by at least one of the processor cores based on the one or more thermodynamic process characteristics and the one or more thermodynamic processor-core characteristics (314).

In some embodiments, the computer system updates stored values of the one or more thermodynamic process characteristics associated with the process when the process is completed, thereby facilitating closed-loop control (316). Moreover, in some embodiments the computer system updates stored values of the one or more thermodynamic processor-core characteristics associated with operation of the set of processor cores after a time interval has elapsed, thereby facilitating closed-loop control (318).

Figure 3B:
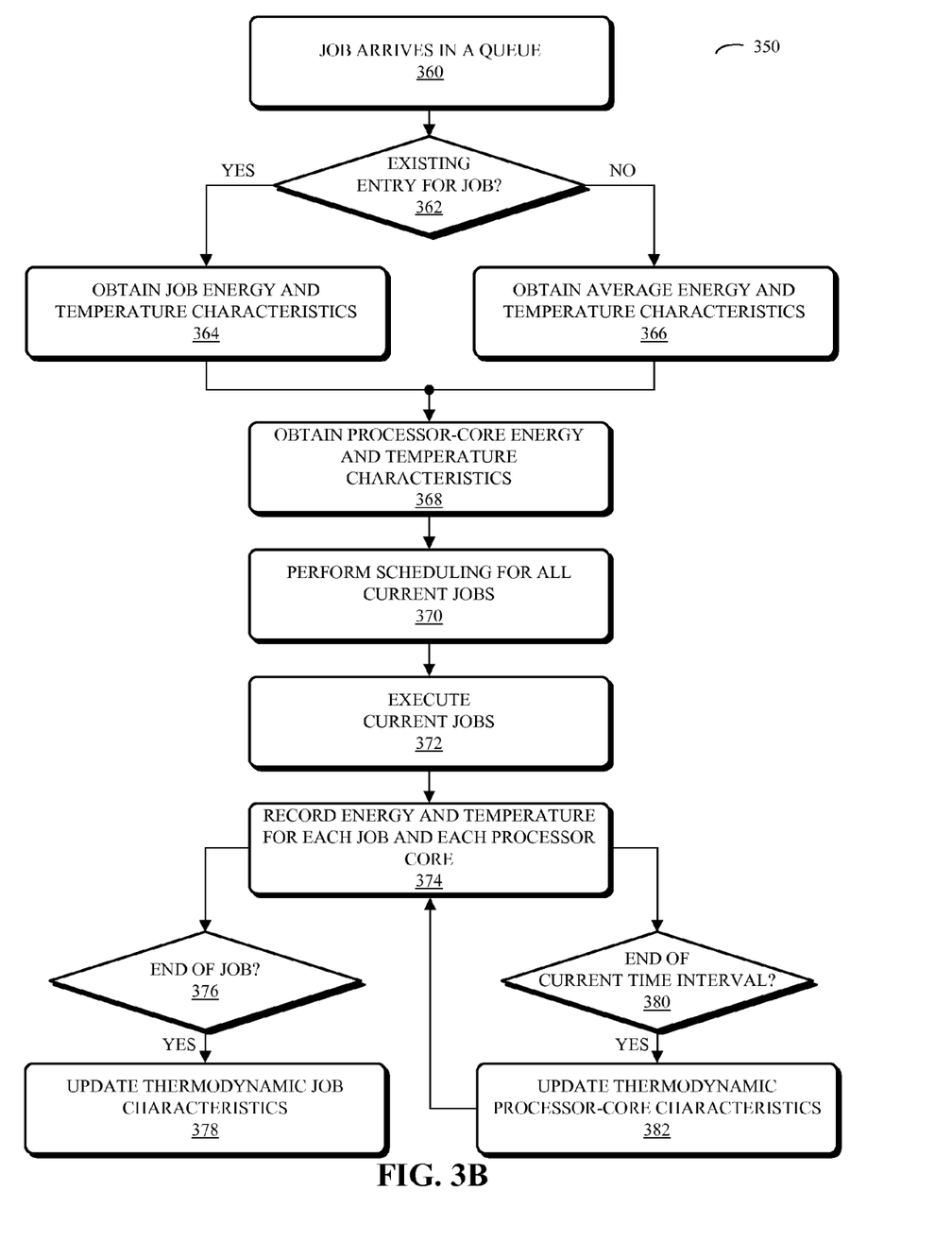
FIG. 3B is a flow chart illustrating a process for scheduling loads across a set of processor cores in accordance with an embodiment of the present invention.

FIG. 3B presents a flow chart illustrating an embodiment of a process 350 for scheduling loads across a set of processor cores, which may be implemented by a computer system, such as the computer system 100 (FIG. 1) and/or the computer system 200 (FIG. 2). During operation, a job arrives in a queue (360) in the computer system. Next, the computer system determines if there is an existing entry for the job (362) in a table of thermodynamic job characteristics. If so, the computer system obtains energy-consumption and temperature characteristics (364) for the job, which may be based on values determined during previous executions of the job (such as an average of the values determined during the previous executions). If not, the computer system obtains average energy-consumption and temperature characteristics (366), for example, based on the entries for other jobs.

Then, the computer system may obtain current or recent processor-core energy-consumption and temperature characteristics (368) for the processor cores in the computer system. Scheduler in the computer system then performs scheduling for all current jobs (370) using the thermodynamic characteristics associated with the job, as well as the thermodynamic characteristics of the processor cores.

Next, the computer system executes the jobs (372). While the jobs are executing, a system-telemetry monitor determines the energy-consumption and temperature for each job (i.e., the values for the processor cores executing the given job) and for each processor core (374). In particular, at the end of the job (376), the computer system updates the appropriate entries in the thermodynamic job characteristics (378). Moreover, at the end of a current time interval (380), while the jobs are executing, the computer system updates the appropriate entries in the thermodynamic processor-core characteristics (382). These updates allow the impact of the current execution profile and the historical impact to be assessed during subsequent scheduling.

In some embodiments, the scheduler performs a bi-variate optimization based on the energy consumption and temperature (or thermal history) associated with previous executions of the given job, and based on the current or recent energy consumption and temperature (or thermal stress) of the processor cores, to determine how to allocate the jobs on the processor cores in the computer system. In general, the scheduler may assign jobs to processor cores that have low energy consumption and/or low temperatures (or thermal stress, i.e., low, temperature histories). Thus, the most-stressful jobs may be assigned to the least-stressed processor cores (such as the processor cores with the least thermal stress). However, other factors, such as load balance, may also be used during the scheduling. Consequently, in some embodiments these factors may outweigh the temperature bias and/or the energy-consumption bias in the scheduler.

Note that there are a variety of ways to achieve temperature and energy-consumption balance. Thus, the scheduler could have different cost functions with different weights to emphasize one variable (such as energy consumption) over the other (such as temperature) during the scheduling. Moreover, in some embodiments the scheduler may optimize based on one variable and then the other.

In an exemplary embodiment, the current time interval is: 1 second, 10 seconds, 30 seconds, 1 minute, 5 minutes, 10 minutes, and/or 30 minutes. Moreover, in an exemplary embodiment the temperatures in the data structures include the temperature in the processor cores and the temperature of communication components in the computer system.

Note that it is entirely possible that some jobs may randomly consume different amounts of power (and thus, generate different peak temperatures) each time they are performed. For such jobs, the variance of the stored temperature and energy-consumption values will be high and the resulting scheduling will be no worse than with conventional load-balancing algorithms. However, for jobs that use similar resources every time they are performed, and which have similar temperature and energy consumption each time they are executed on a given processor or processor core, machine-learning techniques in the scheduler may achieve a smaller and smaller variance during consecutive instances of the scheduling, thereby improving energy utilization and reliability, and reducing leakage power.

Note that in some embodiments of processes 300 (FIG. 3A) and/or 350 there may be additional or fewer operations. Moreover, the order of the operations may be changed, and two or more operations may be combined into a single operation.

Figure 4:
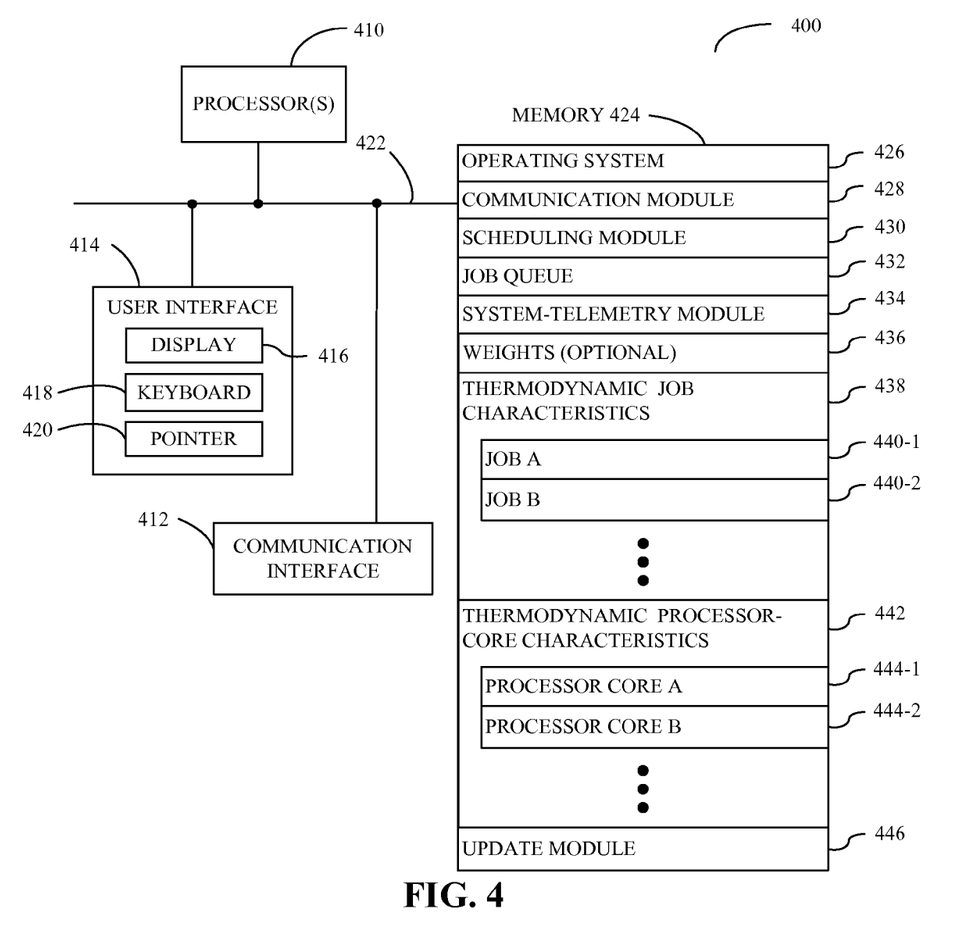
FIG. 4 is a block diagram illustrating a computer system in accordance with an embodiment of the present invention.

FIG. 4 presents a block diagram illustrating an embodiment of computer system 400, such as the computer system 100 in FIG. 1 and/or the computer system 200 in FIG. 2. Computer system 400 includes one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including scheduling module 430 (or a set of instructions), system-telemetry module 434 (or a set of instructions), and/or update module 446 (or a set of instructions). System-telemetry module 434 may aggregate thermodynamic characteristics associated with various jobs in thermodynamic job characteristics 438 and associated with the processors (or processor cores) 410 in thermodynamic processor-core characteristics 442.

Moreover, scheduling module 430 may assign jobs in job queue 432 to one or more of the processors (or processor cores) 410 based on the thermodynamic job characteristics 438 (such as the characteristics associated with job A 440-1 and job B 440-2) and/or the thermodynamic processor-core characteristics 442 (such as the characteristics associated with processor A 444-1 and processor B 444-2). In some embodiments, the thermodynamic job characteristics 438 and/or the thermodynamic processor-core characteristics 442 are assigned corresponding optional weights 436 when the scheduling is determined.

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processors (or processor cores) 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components. Moreover, two or more components may be combined into a single component and/or a position of one or more components may be changed. In some embodiments the functionality of computer system 400 may be implemented more in hardware and less in software, or less in hardware and more in software, as is known in the art.

Figure 5:
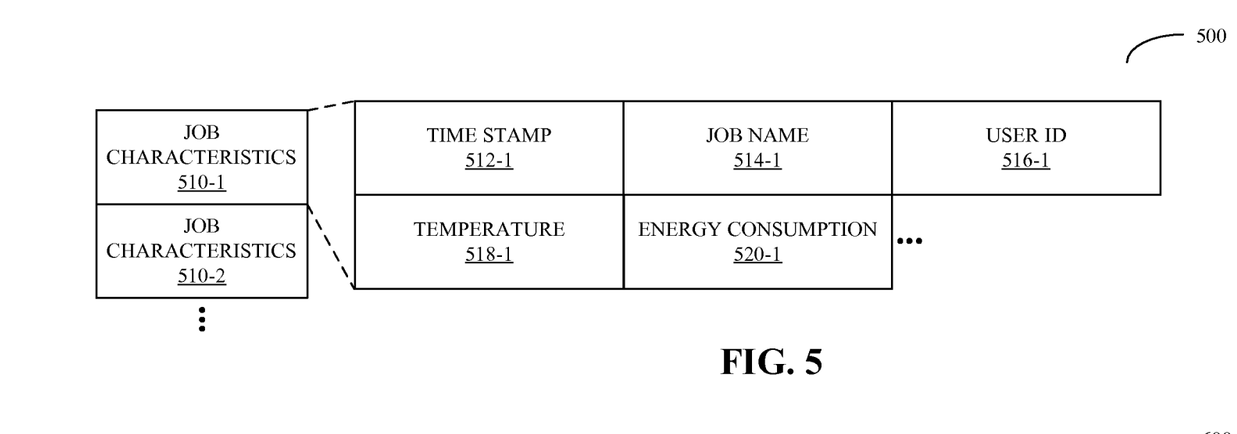
FIG. 5 is a block diagram illustrating a data structure in accordance with an embodiment of the present invention.

We now discuss data structures that may be used in the computer systems 100 (FIG. 1), 200 (FIG. 2), and/or 400 (FIG. 4). FIG. 5 presents a block diagram illustrating an embodiment of a data structure. This data structure may include job characteristics 510. More specifically, a given instance of the job characteristics 510, such as job characteristics 510-1, may include: a time stamp 512-1, a job name 514-1, a user id 516-1, a temperature 518-1 (such as the average temperature of one or more processor cores that have previously executed this job), and/or an energy consumption 520-1 (such as the average energy consumption of one or more processor cores that have previously executed this job).

Figure 6:
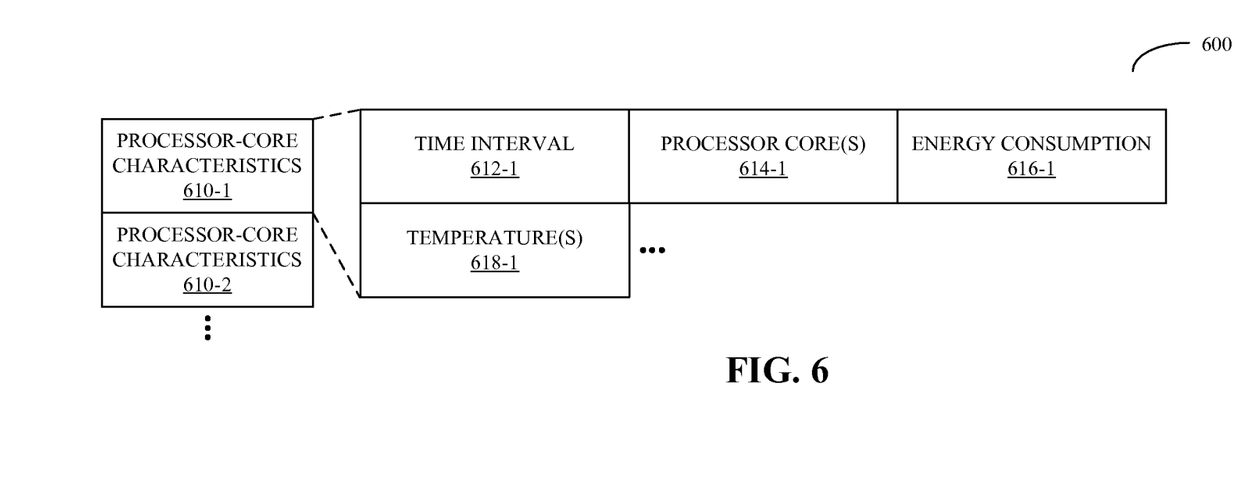
FIG. 6 is a block diagram illustrating a data structure in accordance with an embodiment of the present invention.

FIG. 6 presents a block diagram illustrating an embodiment of a data structure. This data structure may include processor-core characteristics 610. More specifically, a given instance of the processor-core characteristics 610, such as processor-core characteristics 610-1, may include: a time interval 612-1, one or more processor cores 614-1, and their associated energy consumption 616-1 and temperatures 618-1 during the time interval 612-1.

Note that that in some embodiments of the data structures 500 (FIG. 5) and/or 600 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling loads across a set of processor cores, comprising:
receiving a process to be executed;
obtaining one or more thermodynamic process characteristics associated with the process and one or more thermodynamic processor-core characteristics associated with operation of the set of processor cores, and wherein the one or more thermodynamic process characteristics are based on an average of one or more thermodynamic process characteristics associated with previous executions of other processes; and
balancing an energy consumption and a temperature distribution in the set of processor cores by scheduling the process to be executed by at least one of the processor cores based on the one or more thermodynamic process characteristics and the one or more thermodynamic processor-core characteristics.

2. The method of claim 1, wherein the one or more thermodynamic process characteristics are associated with previous executions of the process.

3. The method of claim 1, wherein the one or more thermodynamic process characteristics include a thermal history.

4. The method of claim 1, wherein the one or more thermodynamic process characteristics include energy consumption.

5. The method of claim 1, wherein the one or more thermodynamic process characteristics include energy consumption and a thermal history.

6. The method of claim 1, wherein the one or more thermodynamic processor-core characteristics include a thermal history.

7. The method of claim 1, wherein the one or more thermodynamic processor-core characteristics include energy consumption.

8. The method of claim 1, wherein the one or more thermodynamic processor-core characteristics include energy consumption and a thermal history.

9. The method of claim 1, wherein the scheduling is based on a bi-variate function that includes the one or more thermodynamic process characteristics and the one or more thermodynamic processor-core characteristics.

10. The method of claim 9, wherein the bi-variate function includes energy consumption and a thermal history of the set of processor cores.

11. The method of claim 1, wherein the scheduling is initially based on either the one or more thermodynamic process characteristics or the one or more thermodynamic processor-core characteristics, and is then refined based on the other of the one or more thermodynamic process characteristics and the one or more thermodynamic processor-core characteristics.

12. The method of claim 1, wherein the one or more thermodynamic process characteristics and the one or more thermodynamic processor-core characteristics are assigned different weights when the scheduling is determined.

13. The method of claim 1, wherein the scheduling of the process involves assigning the process to one or more processor cores that have the least thermal stress.

14. The method of claim 1, wherein the set of processor cores are included in multiple processors.

15. The method of claim 1, wherein the set of processor cores are included in a single processor.

16. The method of claim 1, further comprising updating stored values of the one or more thermodynamic process characteristics associated with the process when the process is completed, thereby facilitating closed-loop control.

17. The method of claim 1, further comprising updating stored values of the one or more thermodynamic processor-core characteristics associated with operation of the set of processor cores after a time interval has elapsed, thereby facilitating closed-loop control.

18. A computer program product for use in conjunction with a computer system, the computer program product comprising a non-transitory computer-readable storage medium and a computer-program mechanism embedded therein for scheduling loads across a set of processor cores, the computer-program mechanism including:
  instructions for receiving a process to be executed;
  instructions for obtaining one or more thermodynamic process characteristics associated with the process and one or more thermodynamic processor-core characteristics associated with operation of the set of processor cores, and wherein the one or more thermodynamic process characteristics are based on an average of one or more thermodynamic process characteristics associated with previous executions of other processes; and
  instructions for balancing an energy consumption and a temperature distribution in the set of processor cores by scheduling the process to be executed by at least one of the processor cores based on the one or more thermodynamic process characteristics and the one or more thermodynamic processor-core characteristics.

19. A computer system, comprising:
a set of processor cores;
memory configured to store thermodynamic process characteristics associated with processes and configured to store thermodynamic characteristics associated with operation of the set of processor cores; and
a scheduler, wherein the scheduler is configured to execute instructions, and wherein the instructions include:
instructions for receiving a process to be executed;
instructions for obtaining one or more thermodynamic process characteristics associated with the process and one or more thermodynamic processor-core characteristics associated with operation of the set of processor cores, and wherein the one or more thermodynamic process characteristics are based on an average of one or more thermodynamic process characteristics associated with previous executions of other processes; and
instructions for balancing an energy consumption and a temperature distribution in the set of processor cores by scheduling the process to be executed by at least one of the processor cores based on the one or more thermodynamic process characteristics and the one or more thermodynamic processor-core characteristics.

* * * * *